United States Patent
Mittmann et al.

(10) Patent No.: US 6,349,843 B1
(45) Date of Patent: *Feb. 26, 2002

(54) PAN REMOVAL RAMP

(75) Inventors: Jeffrey C. Mittmann, Plymouth; Rebecca J. Schreiber-Pethan, Sheboygan; Cory R. Boudreau, Madison; William C. Lindeman, Marshall, all of WI (US)

(73) Assignee: The Vollrath Company LLC, Sheboygan, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/285,205

(22) Filed: Apr. 1, 1999

(51) Int. Cl.[7] .................................................. B65D 1/44
(52) U.S. Cl. ..................... 220/573.4; 220/657; 220/756
(58) Field of Search ............................. 220/657, 573.4, 220/573.5, 670, 756, 759, 767, 768, 769, 770; 206/499, 514, 558; D7/500, 543, 545, 546, 549, 550.1, 552.1, 554.3, 588, 323, 331; 99/426, 449

(56) References Cited

U.S. PATENT DOCUMENTS

| | | | |
|---|---|---|---|
| D103,671 S | | 3/1937 | Connor |
| 2,644,443 A | * | 7/1953 | Barnsteiner ................. 220/657 |
| 2,646,762 A | | 7/1953 | Ingraham et al. |
| 3,112,948 A | * | 12/1963 | Burns ...................... 220/759 X |
| 3,179,287 A | * | 4/1965 | Rickmeier, Jr. ............. 220/324 |
| D206,450 S | | 12/1966 | Lloyd |
| 3,581,970 A | * | 6/1971 | Colato |
| D240,714 S | | 7/1976 | White |
| 4,113,095 A | * | 9/1978 | Dietz et al. ................. 206/508 |
| 4,204,609 A | | 5/1980 | Kuhn |
| 4,298,156 A | * | 11/1981 | Reifers et al. |
| D268,622 S | | 4/1983 | Wolters et al. |
| D275,500 S | | 9/1984 | Tyke |
| 4,616,762 A | | 10/1986 | Alexander |
| D288,396 S | | 2/1987 | Ritman |

(List continued on next page.)

FOREIGN PATENT DOCUMENTS

| | | |
|---|---|---|
| DE | 93 21 150 | 7/1996 |
| GB | 19179 | 1/1910 |
| GB | 463538 | 4/1937 |
| GB | 2 270 459 | 3/1994 |
| WO | 94/15152 | 7/1994 |

OTHER PUBLICATIONS

"Vollrath Super Pan" Catalog; Form No. 35001; 1986 The Vollrath Company, 4 pages.

"1989 Cambro Catalog"; First Edition; 6 total pages (cover page, pp. 2, 18–21).

"Rubbermaid Food Specialists"; F–200 Litho/5–78; 6 total pages.

"Polarware Food Service" Catalog; Revised May 1988; 4 total pages.

"Carlisle Foodservice Products" Catalog; 3 total pages (cover page, back page and p. 9).

Primary Examiner—Gary E. Elkins
(74) Attorney, Agent, or Firm—Foley & Lardner (57) ABSTRACT

A pan for use with a well for receiving the pan is disclosed herein. The pan includes a bottom panel, a plurality of walls, and a ramp. The plurality of walls extend upwardly from the bottom panel and define a cavity. The plurality of walls also have an upper end which defines a top opening. The upper end has an extension away from the cavity which defines a rim. The ramp is proximate the rim and exterior to the cavity, whereby the pan rides up on the ramp when the pan is drawn up against the well.

81 Claims, 5 Drawing Sheets

U.S. PATENT DOCUMENTS

| | | | |
|---|---|---|---|
| 4,660,734 A | | 4/1987 | Heaney et al. |
| 4,828,112 A | | 5/1989 | Vollrath et al. |
| 4,967,908 A | * | 11/1990 | Kessler |
| 4,969,569 A | * | 11/1990 | Anders ........................ 220/629 |
| 4,971,216 A | * | 11/1990 | Fortune ....................... 220/756 |
| 5,018,623 A | * | 5/1991 | Hrenyo |
| 5,029,721 A | * | 7/1991 | Timpe ......................... 220/769 |
| 5,045,672 A | | 9/1991 | Scott |
| 5,131,708 A | * | 7/1992 | Denzin ........................ 294/168 |
| D333,944 S | | 3/1993 | Denzin et al. |
| 5,279,443 A | * | 1/1994 | Koda et al. .................. 220/769 |
| 5,392,948 A | | 2/1995 | McEntee |
| D365,501 S | | 12/1995 | Daugherty et al. |
| 5,511,467 A | * | 4/1996 | Motley et al. .......... 220/743 X |
| 5,626,256 A | | 5/1997 | Onneweer |
| 5,628,427 A | | 5/1997 | Hayes |
| 5,676,276 A | | 10/1997 | Zielinski et al. |
| 5,769,261 A | * | 6/1998 | Gaffney et al. .............. 220/831 |
| D399,702 S | * | 10/1998 | Mishan ........................ D7/550 |
| 5,878,656 A | | 3/1999 | Fletcher et al. |
| D417,361 S | | 12/1999 | Mittmann et al. |

\* cited by examiner

PAN REMOVAL RAMP

FIELD OF THE INVENTION

The invention relates generally to the field of pans. More particularly, the invention relates to pans for use in buffet or steam tables.

BACKGROUND OF THE INVENTION

Pans used in buffet or steam tables hold various kinds of hot and cold foods. In other settings, pans may also be removably placed in wells as to hold a variety of other non-food items. Characteristically, though, such pans are designed with a removable feature because they must be removed from tables or wells periodically.

In the case of food pans, they are removed from buffet or steam tables and replaced to replenish food or to clean the pan and the table. In addition to the removal capability, food pans must also be configured to provide a seal between the pan and the table such that steam or cold air below the pan (for example, in a well) will not escape around the edges of the pan. Maintaining the heat or cold below the pan serves a principle purpose of the use of food pans. That is, food pans make food accessible while keeping the food hot or cold.

Conventional food pans are typically constructed with a top edge extending outwardly and resting on the table or top of the well to provide a seal with the table or top of the well. Alternatively, food pans achieve a seal by having a down-turned outer edge. While providing a seal, such designs make it difficult to remove the pans from the table or well. To remove the pans, for example, the edge of the pan must be lifted from the table or well by wedging either a utensil, finger, or other tool under the pan. This removal process can be cumbersome and dangerous because the surface under the edge of the pan may be very hot.

Thus, there is a need for a pan which is more easily removed from a buffet or steam table or well. Further, there is a need for a pan receiving and removal system whereby a pan and well are designed such that the pan is easily received into and removed from the well.

SUMMARY OF THE INVENTION

One embodiment of the invention relates to a pan for use with a well for receiving the pan. The pan includes a bottom panel, a plurality of walls, and a ramp. The plurality of walls extend upwardly from the bottom panel and define a cavity. The plurality of walls have an upper end which defines a top opening. The upper end has an extension away from the cavity and defines a rim. The ramp is proximate the rim and exterior to the cavity, whereby the pan rides up on the ramp when the pan is drawn up against the well.

Another embodiment of the invention relates to a pan receiving and removal system. The system includes a well, a pan, and a ramp. The well includes a bottom panel and a plurality of side walls extending upwardly from the bottom panel and defining a cavity. The plurality of side walls have an upper end. The well further includes a plurality of platforms extending away from the cavity at the upper end of the plurality of side walls. The pan includes a bottom panel and a plurality of walls extending upwardly from the bottom panel and defining a cavity.

The plurality of walls have an upper end which defines a top opening. The upper end has an extension away from the cavity which defines a rim. The ramp is proximate the rim and exterior to the cavity between one of the plurality of walls at the upper end and the rim of the pan. The pan rides up on the ramp when the pan is drawn up against the well.

Another embodiment of the invention relates to a pan removing and receiving system. The system includes a pan, a means for receiving the pan, and a means for providing an inclined surface. The pan includes a bottom panel and a plurality of walls extending upwardly from the bottom panel and defining a cavity. The plurality of walls have an upper end which define a top opening. The upper end has an extension away from the cavity which defines a rim. The means for providing an inclined surface exterior to the cavity is between one of the plurality of walls at the upper end and the rim of the pan, whereby the pan rides up on the inclined surface when the pan is drawn up against one side wall of the means for receiving the pan and removed therefrom.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

Figure 1:
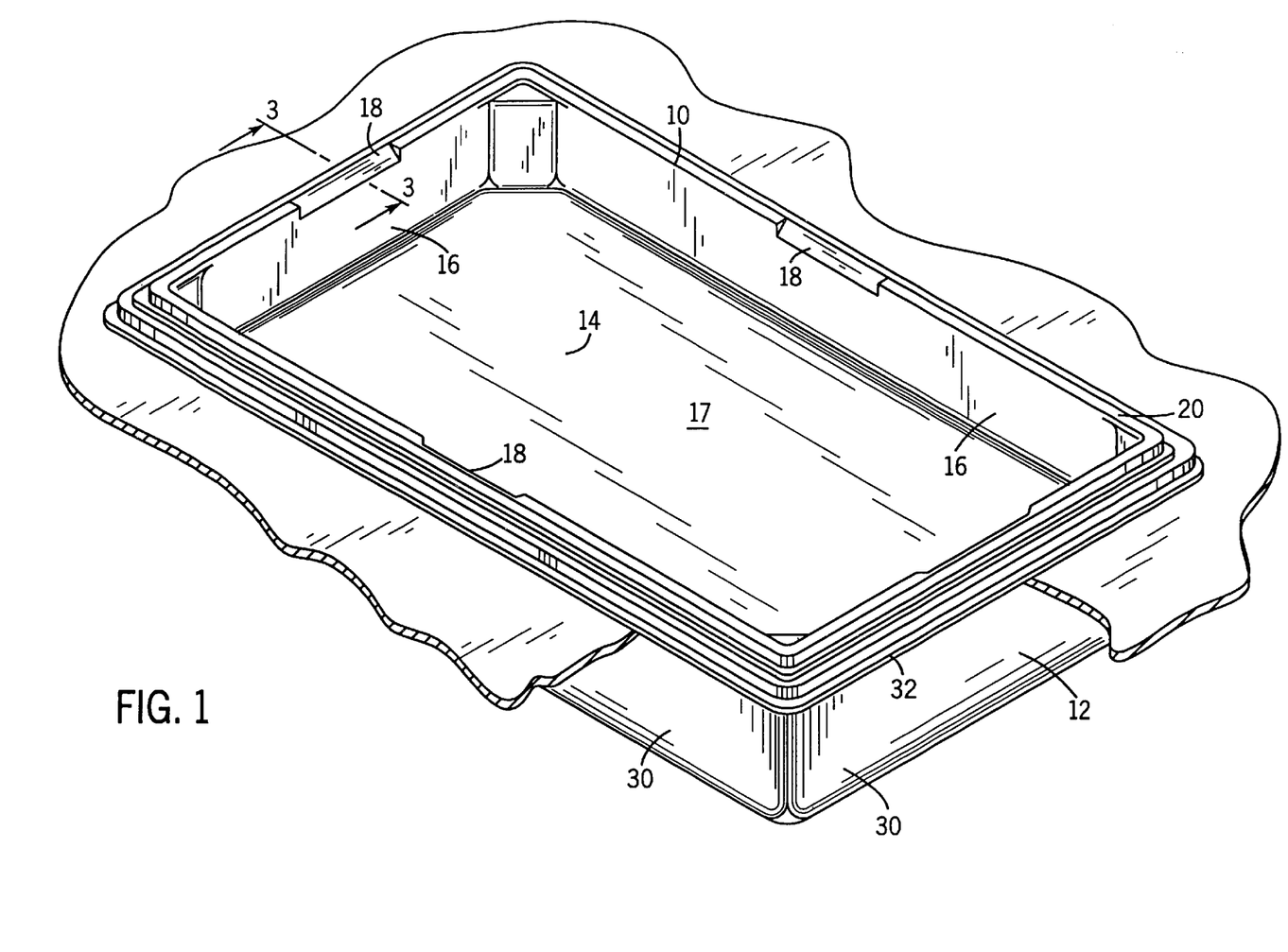
FIG. 1 is a perspective view of a pan received into a well in accordance with the present invention.

FIG. 1 is a perspective view of a pan 10 received into a well 12. Pan 10 includes a bottom panel 14, a plurality of walls 16, and indicators 18. Bottom panel 14 and at least one wall 16 are imperforate. Alternatively, panel 14 and at least one of walls 16 may include perforations depending upon the intended use of pan 10. Walls 16 extend upwardly from bottom panel 14 and define a cavity 17. Walls 16 have an upper end defining a top opening. Each upper end of walls 16 has an extension away from cavity 17 defining a rim 20. Rim 20 alternatively forms a concavity facing bottom panel 14. Indicators 18 are indentations or depressions in the upper end of plurality of walls 16. Indicators 18 indicate the location of a ramp for removing pan 10 from well 12 under rim 20.

Well 12 includes a bottom panel and a plurality of side walls 30. Side walls 30 extend upwardly from bottom panel of well 12 and define a cavity 19 (shown in FIG. 3). Side walls 30 have an upper end defining a top opening. The upper end of side walls 30 has an extension away from cavity 19 defining a platform 32. Rim 20 and platform 32 engage to form a seal when pan 10 is received into well 12.

The exemplary embodiment shows pan 10 received into a well 12 where well 12 is a water pan. Alternatively, well 12 is integrally formed as part of a single unitary body with a buffet or steam table. Further, well 12 may be provided in a chafer, a marmite, a countertop warmer, a portable warmer, a drop-in warmer, or any other structure with a bottom panel, plurality of side walls, and a cavity for receiving pans.

In the exemplary embodiment, pan 10 and well 12 are rectangular in shape. Pan 10 and well 12 are alternatively any of a variety of shapes. Pan 10 and well 12 are preferably made of stainless steel and have a thickness of approximately 0.030 inches. Manufacturing considerations and different intended uses of pan 10 and well 12 suggest that a variety of different materials and thicknesses may be desired for pan 10 and well 12.

Figures 2, 3, 4, 5, 6:
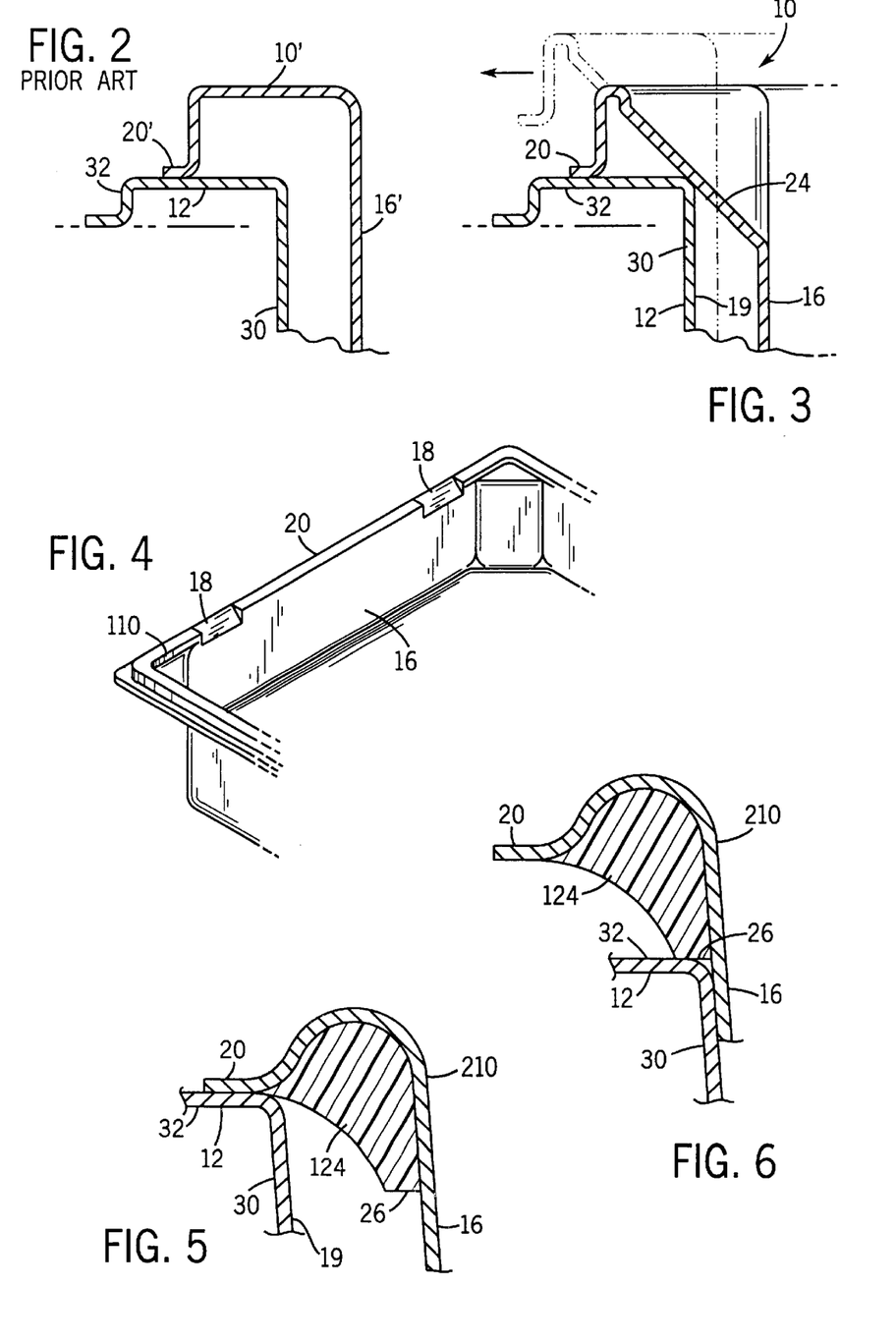
FIG. 2 is a sectional view of walls of a conventional pan and well.
FIG. 3 is a sectional view of the pan and well of FIG. 1, including a ramp.
FIG. 4 is a perspective view of a second exemplary embodiment of the pan and well of FIG. 3.
FIG. 5 is a sectional view of a third exemplary embodiment of the pan and well of FIG. 3, the pan being received into the well.
FIG. 6 is a sectional view of the pan and well of FIG. 5, the pan being removed from the well.

FIGS. 2 and 3 are side-by-side comparisons of a conventional pan 10' and pan 10, respectively, received within a well 12. As shown by FIG. 2, conventional pan 10' includes a wall 16' and a rim 20' extending from wall 16'. In the conventional design, rim 20' must be lifted from platform 32 by wedging a utensil or finger underneath rim 20' in order to remove conventional pan 10' from well 12. Thus, lifting of rim 20' is cumbersome and inconvenient.

In contrast, as shown by FIG. 3, the upper end of wall 16 of pan 10 includes rim 20 and a ramp 24. Ramp 24 is an inclined plane or surface extending between wall 16 and rim 20. Ramp 24 is integrally formed as part of a single unitary body with one of the walls 16 of pan 10. Further, ramp 24 is configured to fit in a gap between well 12 and pan 10 when pan 10 is received into well 12. In the exemplary embodiment, ramp 24 makes an angle of approximately 45 degrees with respect to the plane of bottom panel 14 of pan 10. Ramp 24 alternatively makes an angle ranging from 15 to 60 degrees with respect to the plane of bottom panel 14.

Pan 10 is removed from well 12 by the exertion of a force on wall 16 of pan 10 away from cavity 17. The exerted force engages ramp 24 against side wall 30. Ramp 24 provides a surface for pan 10 to slide up side wall 30 of well 12. Ramp 24 advantageously raises rim 20 above platform 32, where a user can secure a hold on pan 10 for complete removal of pan 10 from well 12. Thus, the cumbersome conventional process is avoided.

FIG. 4 is a perspective view of a pan 110, a second exemplary embodiment of pan 10. Pan 110 is identical to pan 10 except pan 110 includes two indicators 18 at the upper end of the same wall 16. Indicators 18 provide a telltale, indication, or mark as to the location of ramps 24 beneath rim 20. Two ramps below indicators 18 are advantageously spaced apart on the same wall 16 to provide greater stability to pan 110 during removal from well 12. Ramps are alternatively located on any one of opposite longer longitudinally extending walls 16, opposite shorter transversely extending walls 16, adjacent walls 16, and all walls 16.

Although the exemplary embodiment shows indicators 18 as depressions in the upper end of walls 16, indicators 18 may alternatively comprise protrusions or handles, providing a place for a user's fingers to grip when removing pan 10 from well 12. Depressions are formed in the manufacturing of pan 10. No new material is introduced and no additional assembly steps are required beyond drawing and stamping during the manufacturing of pan 10.

FIGS. 5 and 6 are sectional views of a pan 210, a third exemplary embodiment of pan 10. Pan 210 is identical to pan 10 except pan 210 includes a ramp 124. Ramp 124 is an alternative embodiment of ramp 24 and is identical to ramp 24 except that ramp 124 is arcuate and fills the concavity or space between rim 20 and wall 16.

In the exemplary embodiment, ramp 124 includes a resting surface 26. As shown in FIG. 6, resting surface 26 provides a surface which at least partially rests on platform 32 when pan 210 is drawn up against side walls 30 for removal of pan 210 from well 12. Surface 26 resting on platform 32 keeps pan 210 in a raised position while user places fingers under rim 20 to completely remove pan 210 from well 12. Resting surface 26 is illustrated as preferably being a flat area. Resting surface 26 also enables steam to slowly escape from well 12 before pan 210 is lifted. Resting surface 26 is alternatively a pointed area or any other surface which is capable of resting on platform 32.

Figures 7, 8, 9, 10:
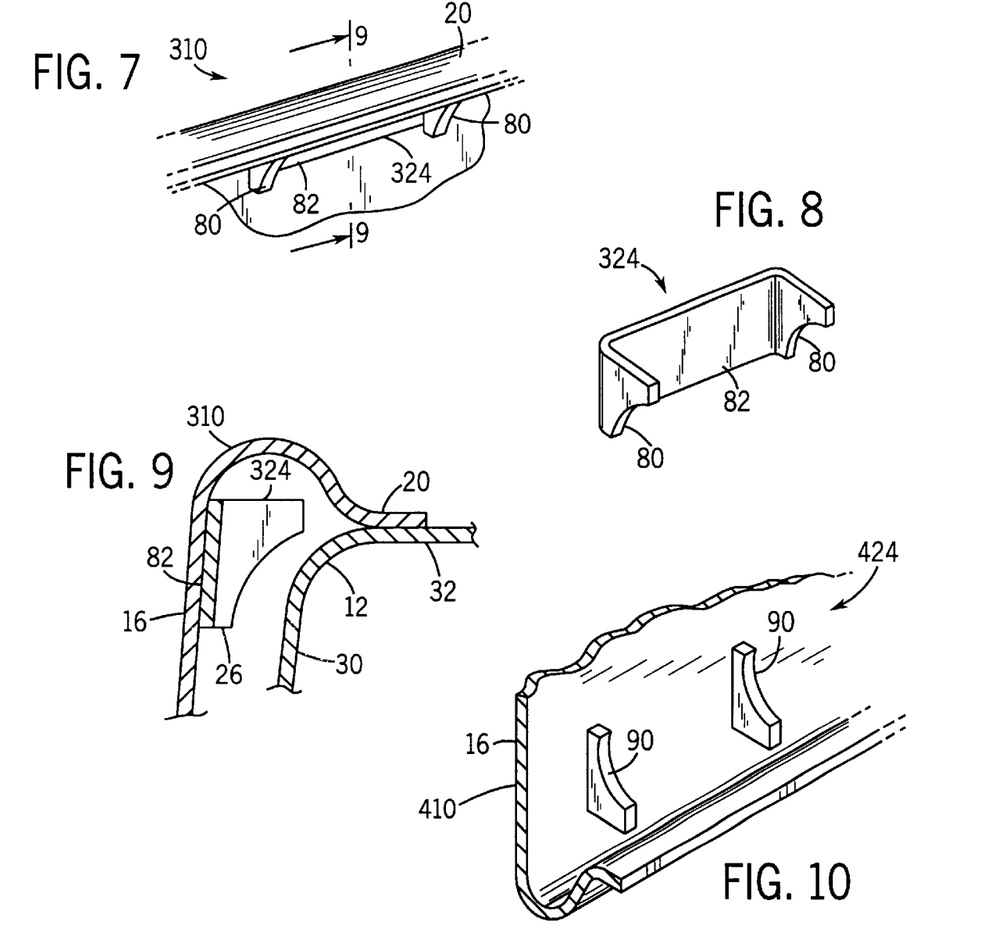
FIG. 7 is a side view of a fourth exemplary embodiment of the pan of FIG. 3, including a ramp.
FIG. 8 is a perspective view of the ramp of FIG. 7.
FIG. 9 is a sectional view of the pan of FIG. 7, including the ramp.
FIG. 10 is a sectional, up-side-down view of a fifth exemplary embodiment of the pan of FIG. 3, including two ramps.

FIG. 7 is a sectional view of a pan 310, a fourth exemplary embodiment of pan 10. Pan 310 is identical to pan 10 except pan 310 includes a ramp 324. Ramp 324 is an alternative embodiment of ramp 24. As shown in FIG. 8, ramp 324 includes two inclined surfaces 80 coupled together by a mounting portion 82 and mounted on wall 16. As shown in FIG. 9, mounting portion 82 provides a surface for ramp 324 to be mounted to wall 16 of pan 310 as well as additional support for two inclined surfaces 80. Ramp 324 also includes resting surface 26 which is capable of resting on platform 32 when pan 310 is removed from well 12.

Figure 11:
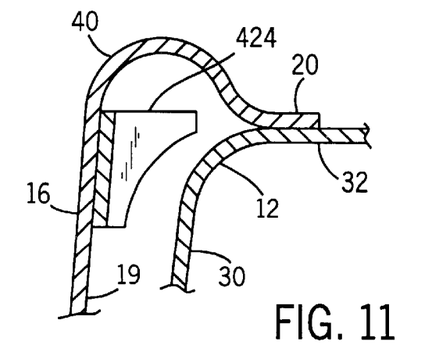
FIG. 11 is a sectional view of the pan and ramps of FIG. 10.

FIG. 10 is a sectional, up-side-down view of a pan 410, a fifth exemplary embodiment of pan 10. Pan 410 is identical to pan 10 except pan 410 includes a ramp 424. Ramp 424 is an alternative embodiment of ramp 24 and is identical to ramp 324 except that ramp 424 does not have a mounting portion 82. Ramp 424 includes two inclined surface portions 90 which are individually mounted to wall 16 of pan 10. As shown in FIG. 11, inclined surfaces 90 provide a surface against which pan 410 rides up when removed from well 12.

Figure 12:
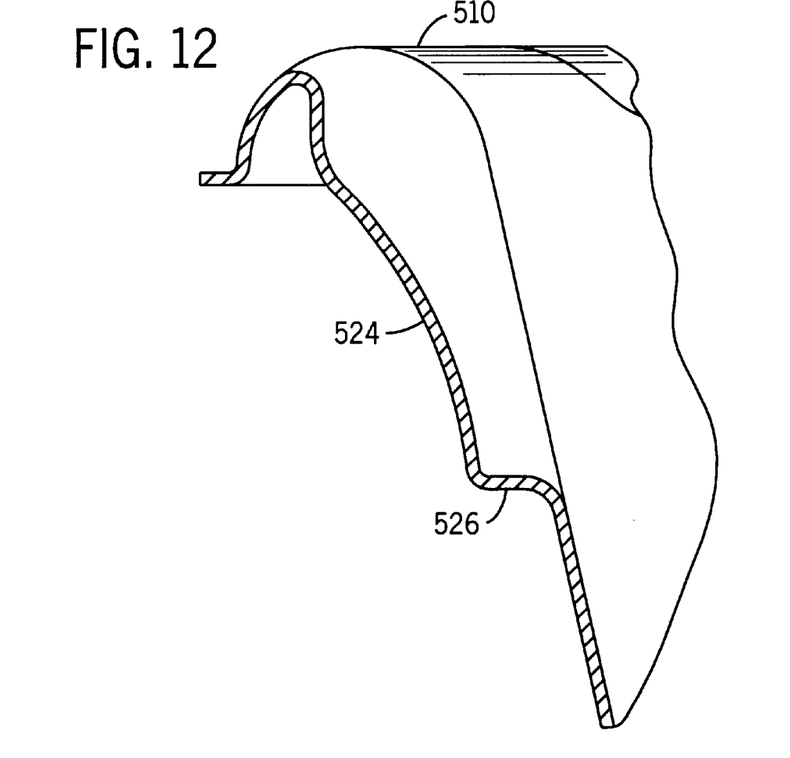
FIG. 12 is a sectional view of a sixth exemplary embodiment of the pan of FIG. 3.

FIG. 12 is a sectional view of a pan 510, a sixth exemplary embodiment of pan 10. Pan 510 is identical to pan 10 except pan 10 includes a ramp 524. Ramp 524 is an alternative embodiment of ramp 24 and is identical to ramp 24 except that ramp 524 has an inclined surface which is arcuate in shape. Further, ramp 524 includes a resting surface 26. Resting surface 26 provides a surface which at least partially rests on platform 32 when pan 510 is drawn up against side walls 30 for removal of pan 510 from well 12.

Figure 13:
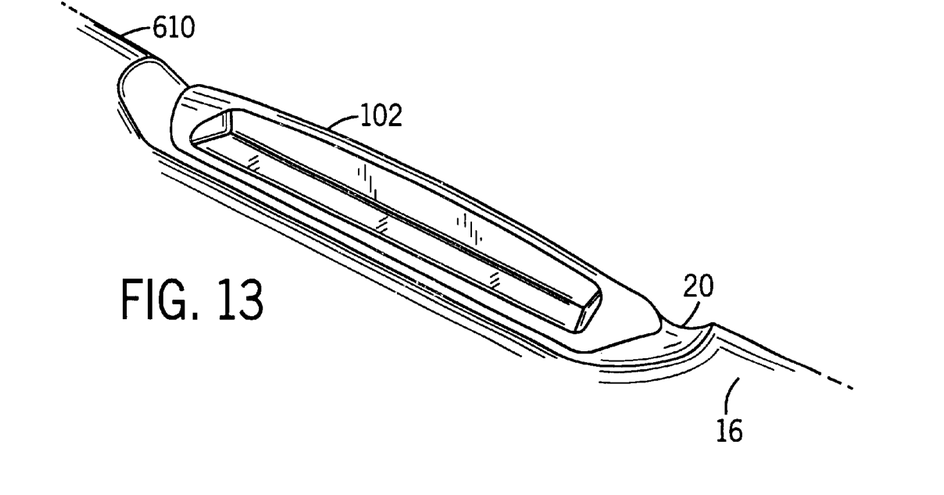
FIG. 13 is a perspective view of a ramp indicating handle on a seventh exemplary embodiment of the pan of FIG. 3.

FIG. 13 is a perspective view of a handle 102 on wall 16 of a pan 610, a seventh exemplary embodiment of pan 10. Pan 610 is identical to pan 10 except that in place of indicator 18, pan 610 has handle 102. Like indicator 18, handle 102 is located on the opposite side of wall 16 from ramp 24. As such, handle 102 provides an indication or mark as to the location of ramp 24. Handle 102 is configured to receive a user's fingers such that removal of pan 610 using ramp 24 is more easily achieved.

Alternate designs of handle 102 can be used to both mark the location of a ramp and provide a surface to grip the upper portion of wall 16 of pan 10. Further, color coding of handle 102 is alternatively employed to indicate a variety of features. For example, a certain colored handle 102 may indicate a certain type of food or type of food preparation for a particular pan 610. Different colors may alternatively indicate different food preparation stages.

Figures 14, 15:
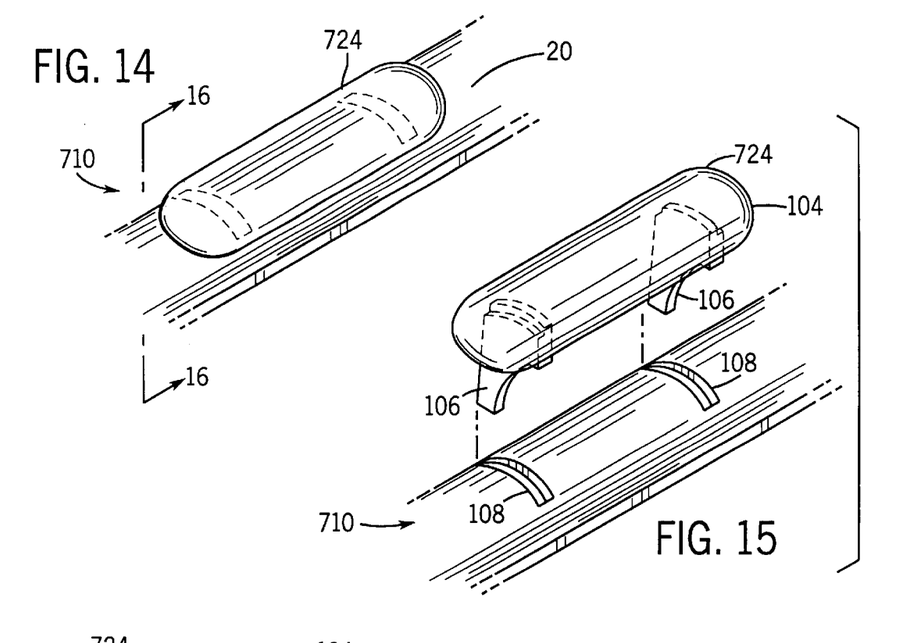
FIG. 14 is a perspective view of an eighth exemplary embodiment of the pan of FIG. 3, including a ramp with a mounting portion received into the pan.
FIG. 15 is a perspective view of the pan of FIG. 14, including the ramp removed from apertures in the pan.

FIGS. 14 and 15 are perspective views of a pan 710, an eighth exemplary embodiment of pan 10. Pan 710 is identical to pan 10 except that pan 710 includes a ramp 724. Ramp 724 is mounted in rim 20 and is an alternative embodiment of ramp 24. As shown in FIG. 15, ramp 724 includes a mounting portion 104 and fingers 106. Mounting portion 104 serves as an indicator or marker as to the location of ramp 724. Like indicator 18 (FIG. 1) or handle 102 (FIG. 14), mounting portion 104 is alternatively color coded for a variety of uses. Further, mounting portion 104 is designed in a variety of different shapes which are capable of receiving a user's fingers during removal of pan 710 from well 12. Mounting portion 104 is alternatively included in rim 20.

Figure 16:
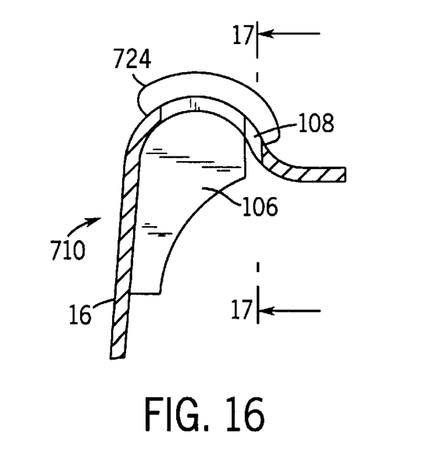
FIG. 16 is a sectional view of the pan of FIG. 14, including the ramp with the mounting portion.
Figure 17:
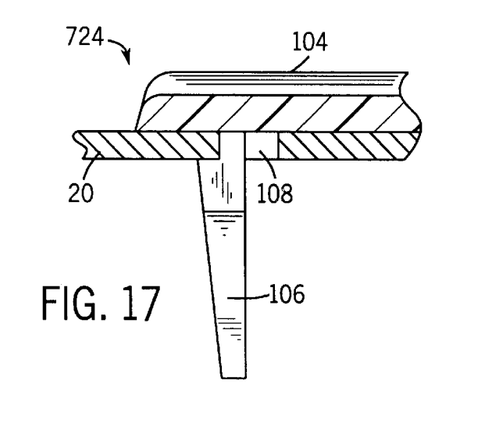
FIG. 17 is a sectional view of the pan of FIG. 16 taken along lines 17—17.

As shown in FIGS. 16 and 17, fingers 106 of ramp 724 extend below mounting portion 104 though apertures 108 in pan 710. Once fingers 106 are received into apertures 108, ramp 724 provides a surface for pan 710 to slide up wall 30 of well 12. Fingers 106 are adapted flex between a first pan engaging position and a second pan disengaging position. In the exemplary embodiment, fingers 106 are squeezed toward each other when in the second pan disengaging position. In the second pan disengaging position, fingers 106 are removably received through apertures 108 in rim 20. Thus, ramp 724 is capable of easy removal from pan 710 for cleaning and/or repair. Such capability is advantageous with food pans in particular because sanitation of the pans is so important.

Ramps 24, 124, 324, 424, 524, and 724 each allow pan 10 to be more easily removed from a buffet or steam table or well. Easier removal makes use of pans including ramps 24, 124, 324, 424, 524, or 724 more convenient than those without. Further, removal of pan 10 using ramps 24, 124, 324, 424, 524, and 724 does not require the use of utensils. Nevertheless, where utensils are used, ramps 24, 124, 324, 424, 524, and 724 facilitate the use of utensils. Further, resting surface 26 of ramps 24, 124, 324, 424, 524, and 724 also provides for easier removal of pan 10 from well 12. Indicator 18, handle 102, and mounting portion 104 provide a telltale, indication, or mark as to the location of ramps 24, 124, 324, 424, 524, and 724 in pan 10. Indicator 18, handle 102, and mounting portion 104 are advantageously adapted to receive a user's fingers to even further facilitate removal of pan 10 from well 12.

While ramps 24, 124, 324, 424, 524, and 724 improve in the removal of pan 10 from well 12, each also maintains the ease of proper cleaning of pan 10 and well 12. Such cleaning is important in the use of pan 10. Ramps 24, 124, 324, 424, 524, and 724 are further each easily manufactured. The simplicity and low cost of ramps 24, 124, 324, 424, 524, and 724 are particularly advantageous to the solution each provides. Ramps 24, 124, 324, 424, 524, and 724 allow pan 10 and well 12 to cooperate as a pan receiving and removal system, providing easy receipt and removal of pan 10 into and out of well 12.

It is understood that, while the detailed drawings and specific examples given describe the preferred embodiments for the present inventions, they are for purpose of illustration only. The present invention is not limited to the precise details, methods, materials, and conditions disclosed. For example, although various shapes, locations, and formation methods of ramps 24, 124, 324, 424, 524, and 724 are suggested, others may be used. The invention extends to modifications, combinations, and permutations that nevertheless fall within the scope and spirit of the appended claims.

What is claimed is:

1. A pan for use with a well surrounded by a platform and configured for receiving the pan, the pan comprising:
   a bottom panel;
   a plurality of walls extending upwardly from the bottom panel and defining a cavity, the plurality of walls including a first wall extending in a first plane parallel to a longitudinal axis of the pan and a second wall extending in a second plane parallel to a transverse axis of the pan, the plurality of walls having an upper end defining a top opening, the upper end having an extension away from the cavity and defining a downturned rim, the downturned rim having a support surface; and
   a ramp proximate the rim, exterior to the cavity, the ramp having an exterior sloped surface at least a portion of which extends horizontally across from and below the support surface and also extends outwardly beyond an outermost surface of an adjacent one of the plurality of walls, wherein the sloped surface and the support surface are configured such that the support surface is adapted to rest upon the platform while the sloped surface is secured to or formed as part of the pan and while the pan is positioned in the well, and wherein the sloped surface extends away from the cavity outwardly beyond at least one of the first and second planes, whereby the pan rides up on the ramp when the pan is drawn up against the well.

2. The pan of claim 1, wherein the ramp is releasably affixed to the pan.

3. The pan of claim 2, wherein one of the pan and the ramp includes a mounting portion and wherein the other of the pan and the ramp includes at least one aperture configured to removably receive the mounting portion to releasably affix the ramp to the pan.

4. The pan of claim 3, wherein the ramp includes the mounting portion and wherein the mounting portion includes fingers removably received within the at least one aperture, wherein the fingers resiliently flex between a first pan engaging position and a second pan disengaging position.

5. The pan of claim 1, wherein the ramp has an inclined surface extending opposite a surface defining the cavity.

6. The pan of claim 1, wherein the ramp is permanently mounted to the pan.

7. The pan of claim 1, wherein the ramp is integrally formed as part of a single unitary body with one of the plurality of walls and the extension of the pan.

8. The pan of claim 1, including a resting surface at a lower end of the ramp, the resting surface defining an area whereby the pan rests on a shoulder of the well when the pan is drawn up against the well.

9. The pan of claim 8, wherein the resting surface includes a substantially flat area adapted to rest on the shoulder of the well when the pan is drawn up against the well.

10. The pan of claim 1, further including a plurality of spaced ramps.

11. The pan of claim 10, wherein the plurality of spaced ramps includes a first ramp located on a first wall of the pan and a second ramp located on a second wall of the pan.

12. The pan of claim 11, wherein the first ramp and second ramp are located on opposite walls of the pan.

13. The pan of claim 11, wherein the plurality of walls include first and second opposite longer longitudinally extending walls and third and fourth shorter transversely extending walls, wherein the first ramp and the second ramp are located on the first and second walls, respectively.

14. The pan of claim 11, wherein the plurality of walls include first and second opposite longer longitudinally extending walls and third and fourth shorter transversely extending walls, wherein the first ramp and the second ramp are located on the third and fourth walls, respectively.

15. The pan of claim 11, wherein the first ramp and second ramp are located on adjacent walls of the pan.

16. The pan of claim 10, wherein the plurality of walls include two longitudinally extending walls and two transversely extending walls and wherein the plurality of spaced ramps are located on each of the longitudinally and transversely extending walls of the pan.

17. The pan of claim 10, wherein the plurality of spaced ramps includes a first ramp located on a first wall and a second ramp located on the first wall of the pan.

18. The pan of claim 1, further including an indicator indicating a location of the ramp.

19. The pan of claim 18, wherein the indicator includes a depression in the upper end of the wall.

20. The pan of claim 18, wherein the indicator includes a depression inside the cavity of the pan.

21. The pan of claim 18, wherein the indicator includes a depression above the ramp.

22. The pan of claim 18, wherein the indicator includes a depression configured to receive a plurality of a user's fingers.

23. The pan of claim 18, wherein the indicator is releasably affixed to the pan.

24. The pan of claim 1, wherein the bottom panel is imperforate.

25. The pan of claim 1, wherein at least one of the plurality of walls is imperforate.

26. The pan of claim 1, wherein the rim rests on the platform of the well, providing a seal between the pan and the platform about the well.

27. The pan of claim 1, wherein the plurality of walls form a rectangular shape.

28. The pan of claim 1, wherein the bottom panel of the pan defines a plane and the ramp makes an angle ranging from 15 to 60 degrees with respect to the plane of the bottom panel of the pan.

29. The pan of claim 1, wherein the bottom panel of the pan defines a plane and the ramp makes an angle of about 45 degrees with respect to the plane of the bottom panel of the pan.

30. The pan of claim 1, wherein the ramp includes an arcuate-shaped surface.

31. The pan of claim 1, wherein the well includes a plurality of walls having an upper end and wherein the ramp is adapted to extend adjacent the upper end of one of the plurality of walls of the well when the pan is received into the well.

32. The pan of claim 1, wherein the well includes a plurality of walls having an upper end and wherein the ramp is adapted to be in contact with the upper end of one of the plurality of walls of the well when the pan is received into the well.

33. The pan of claim 1, wherein the ramp is formed from an extension of the rim.

34. The pan of claim 1, wherein the rim forms a concavity facing the bottom panel.

35. The pan of claim 34, wherein the ramp at least partially extends into the concavity.

36. The pan of claim 1 wherein the pan is formed from at least one metal.

37. The pan of claim 1 wherein the pan has an interior sloped surface opposite the exterior sloped surface of the ramp.

38. The pan of claim 37 wherein one of the plurality of walls has a first thickness, wherein the pan has a second thickness between the exterior sloped surface and the interior sloped surface and wherein the first thickness and the second thickness are substantially equal.

39. The pan of claim 1 wherein the cavity has a depth and wherein a majority of the depth extends below a lowermost portion of the ramp.

40. A pan receiving and removal system, the system comprising:
a well including a bottom panel and a plurality of side walls extending upwardly from the bottom panel and defining a cavity, the plurality of side walls having an upper end, the well further including a platform joined to the plurality of side walls along a shoulder and extending away from the cavity at the upper end of the plurality of side walls;
a pan including a bottom panel, a plurality of walls extending upwardly from the bottom panel and defining an interior, the plurality of walls having an upper end defining a top opening, the upper end having an extension away from the interior defining a rim, the rim engaging the horizontal platform at a location spaced from the shoulder when the pan is received into the well; and
a ramp at least partially below the rim and exterior to the interior between one of the plurality of walls at the upper end and the rim of the pan, wherein the ramp extends opposite a portion of at least one of the plurality of walls, the shoulder and the platform of the well and wherein the portion and the ramp are configured to engage one another when the pan is moved relative to the well, whereby the pan rides up on the ramp when the pan is drawn against the well.

41. The pan receiving and removal system of claim 40, wherein the rim engages the platform to form a seal.

42. The pan receiving and removal system of claim 40, wherein the ramp is releasably affixed to the pan.

43. The pan receiving and removal system of claim 40, wherein the ramp is integrally formed as part of a single unitary body with one of the plurality of walls of the pan.

44. The pan receiving and removal system of claim 40, further including an indicator indicating a location of the ramp.

45. The system of claim 40 wherein the pan is formed from at least one metal.

46. The system of claim 40 wherein the ramp has an exterior sloped surface and wherein the pan has an interior sloped surface opposite the exterior sloped surface of the ramp.

47. The system of claim 46 wherein one of the plurality of pan walls has a first thickness, wherein the pan has a second thickness between the exterior sloped surface and the interior sloped surface and wherein the first thickness and the second thickness are substantially equal.

48. The system of claim 40, wherein the cavity has a depth and wherein a majority of the depth extends below a lowermost portion of the ramp.

49. The system of claim 40, wherein the plurality of walls of the pan includes a first pan wall extending in a first plane parallel to a longitudinal axis of the pan and a second pan wall extending in a second plane parallel to a transverse axis of the pan, wherein the plurality of side walls of the well includes a first well wall extending in a third plane parallel to the longitudinal axis of the pan and a second well wall joined to the first well wall at a corner and extending in a fourth plane parallel to the transverse axis of the pan, and wherein at least one of the ramp and the corner at least partially extend between at least one of the first plane and the third plane or between the second plane and the fourth plane.

50. The system of claim 49 wherein the ramp extends away from the cavity outwardly beyond at least one of the first and second planes.

51. A pan removing and receiving system, the system comprising:
- a pan including a bottom panel and a plurality of walls extending upwardly from the bottom panel and defining a cavity, the plurality of walls having an upper end defining a top opening, the upper end having an extension away from the cavity defining a rim;
- a well means for receiving the pan, the well means having a side wall and a horizontal platform joined to the side wall along a shoulder, wherein the rim of the pan engages the horizontal platform at a location spaced outwardly from the shoulder when the pan is received within the well means; and
- a means for providing an inclined surface exterior to the cavity between one of the plurality of walls at the upper end and the rim of the pan and at least partially below the rim, wherein the inclined surface extends opposite a portion of at least one of the side wall, the shoulder and the platform of the well means, wherein the Dortion and the inclined surface are configured to engage one another when the pan is moved relative to the well means while the pan is at least partially in the well means and while the rim is in engagement with the platform, whereby the pan rides up on the inclined surface when the pan is drawn up against a surface of the well means.

52. The pan removing and receiving system of claim 51, wherein the means for providing an inclined surface is releasably affixed to the pan.

53. The pan removing and receiving system of claim 51, wherein the means for providing an inclined surface is integrally formed as part of a single unitary body with one of the plurality of walls of the pan.

54. The pan removing and receiving system of claim 51, further including a means for indicating a location of the means for providing an inclined surface.

55. The system of claim 51 wherein the pan is formed from at least one metal.

56. The system of claim 51 wherein the ramp has an exterior sloped surface and wherein the pan has an interior sloped surface opposite the exterior sloped surface of the ramp.

57. The system of claim 56 wherein one of the plurality of walls of the pan has a first thickness, wherein the pan has a second thickness between the exterior sloped surface and the interior sloped surface and wherein the first thickness and the second thickness are substantially equal.

58. The system of claim 51 wherein the cavity has a depth and wherein a majority of the depth extends below a lowermost portion of the ramp.

59. The system of claim 51 wherein the plurality of walls of the pan includes a first pan wall extending in a first plane parallel to a longitudinal axis of the pan and a second pan wall extending in a second plane parallel to a transverse axis of the pan, wherein the well means includes plurality of well walls including a first well wall extending in a third plane parallel to the longitudinal axis of the pan and a second well wall joined to the first well wall at a corner and extending in a fourth plane parallel to the transverse axis of the pan, and wherein at least one of the inclined surface and the corner at least partially extend between at least one of the first plane and the third plane or between the second plane and the fourth plane.

60. The system of claim 59, wherein the inclined surface extends away from the cavity outwardly beyond at least one of the first and second planes.

61. A pan for use with a well surrounded by a platform and configured for receiving the pan, the pan comprising:
- a bottom panel;
- a plurality of walls extending upwardly from the bottom panel and defining a cavity, the plurality of walls having an upper end defining a top opening, the upper end having an extension away from the cavity and defining a rim, the rim being configured to engage the platform when the pan is positioned within the well; and
- a ramp adapted to be releasably affixed to the pan proximate the rim, exterior to the cavity, while the pan is at least partially in the well and while the rim is in engagement with the platform, whereby the pan rides up on the ramp when the pan is drawn up against the well.

62. The pan of claim 61, wherein one of the pan and the ramp includes a mounting portion and wherein the other of the pan and the ramp includes at least one aperture configured to removably receive the mounting portion to releasably affix the ramp to the pan.

63. The pan of claim 62, wherein the ramp includes the mounting portion and wherein the mounting portion includes fingers removably received within the at least one aperture, wherein the fingers resiliently flex between a first pan engaging position and a second pan disengaging position.

64. A pan for use with a well for receiving the pan, the pan comprising:
- a bottom panel;
- a plurality of walls extending upwardly from the bottom panel and defining a cavity, the plurality of walls having an upper end defining a top opening, the upper end having an extension away from the cavity and defining a rim;
- a ramp proximate the rim, exterior to the cavity, whereby the pan rides up on the ramp when the pan is drawn up against the well; and
- an indicator indicating a location of the ramp, wherein the indicator includes a depression extending parallel to one of a longitudinal axis and a transverse axis of the pan and wherein the depression is configured to receive a plurality of a user's fingers to facilitate gripping of the pan.

65. The pan of claim 64, wherein the indicator is releasably affixed to the pan.

66. A pan for use with a well for receiving the pan, the pan comprising:
- a bottom panel;
- a plurality of walls extending upwardly from the bottom panel and defining a cavity, the plurality of walls having an upper end defining a top opening, the upper end having an extension away from the cavity and defining a rim;

a ramp proximate the rim, exterior to the cavity, wherein the ramp is permanently fixed to at least one of the plurality of walls, whereby the pan rides up on the ramp when the pan is drawn up against the well; and a resting surface at a lower end of the ramp, the resting surface defining an area adapted to rest on a shoulder of the well when the pan is drawn up against the well.

67. The pan of claim 66, wherein the plurality of walls includes a first wall, a second wall and a third wall joined to the first and second walls at first and second corners, respectively, and wherein the ramp extends across a midpoint of the third wall between the first and second corners.

68. The pan of claim 66, wherein the ramp is permanently mounted to the pan.

69. The pan of claim 66, wherein the ramp is integrally formed as part of a single unitary body with one of the plurality of walls and the extension of the pan.

70. A pan for use with a well surrounded by a horizontal platform and configured for receiving the pan, the pan comprising:

a bottom panel;

a plurality of walls extending upwardly and obliquely outward from the bottom panel to an upper end and defining a cavity, the plurality of walls including a first wall extending in a first plane parallel to a longitudinal axis of the pan and a second wall extending in a second plane parallel to a transverse axis of the pan, the upper end having an extension away from the cavity and defining a rim having a support surface; and a ramp at least partially below the rim, exterior to the cavity, wherein the ramp and the support surface are configured such that the support surface is adapted to rest upon the platform while the ramp is secured to or formed as part of the pan while the pan is positioned in the well, and wherein the ramp extends away from the cavity outwardly beyond at least one of the first and second planes, whereby the pan rides up on the ramp when the pan is drawn up against the well.

71. The pan of claim 70 wherein the pan is formed from at least one metal.

72. The pan of claim 70 wherein the pan has an interior sloped surface and wherein the ramp has an exterior sloped surface opposite the interior sloped surface.

73. The pan of claim 72 wherein one of the plurality of walls has a first thickness, wherein the pan has a second thickness between the exterior sloped surface and the interior sloped surface and wherein the first thickness and the second thickness are substantially equal.

74. The pan of claim 70 wherein the cavity has a depth and wherein a majority of the depth extends below a lowermost portion of the ramp.

75. A pan receiving and removal system, the system comprising:

a well including a plurality of well walls and a horizontal platform joined to the plurality of well walls along a shoulder; and a pan received within the well, the pan including:
a bottom panel;
a plurality of pan walls extending upwardly and obliquely outward from the bottom panel to an upper end and defining a cavity, the upper end having an extension away from the cavity and defining a rim having a support surface resting upon the horizontal platform when the pan is positioned within the well; and a ramp at least partially below the rim, exterior to the cavity, wherein the ramp extends opposite a portion of at least one of the well walls, the platform, and the shoulder of the well, wherein the portion and the ramp are configured to engage one another when the pan is moved relative to the well while the pan is at least partially in the well and while the support surface is resting upon the platform, whereby the pan rides up on the ramp when the pan is drawn up against the well.

76. The system of claim 75 wherein the pan is formed from at least one metal.

77. The system of claim 75 wherein the ramp has an exterior sloped surface and wherein the pan has an interior sloped surface opposite the exterior sloped surface of the ramp.

78. The system of claim 77 wherein one of the plurality of pan walls has a first thickness, wherein the pan has a second thickness between the exterior sloped surface and the interior sloped surface and wherein the first thickness and the second thickness are substantially equal.

79. The system of claim 75 wherein the cavity has a depth and wherein a majority of the depth extends below a lowermost portion of the ramp.

80. The system of claim 75 wherein the plurality of pan walls includes a first pan wall extending in a first plane parallel to a longitudinal axis of the pan and a second pan wall extending in a second plane parallel to a transverse axis of the pan, wherein the plurality of well walls includes a first well wall extending in a third plane parallel to the longitudinal axis of the pan and a second well wall joined to the first well wall at a corner and extending in a fourth plane parallel to the transverse axis of the pan, and wherein at least one of the ramp and the corner at least partially extend between at least one of the first plane and the third plane or between the second plane and the fourth plane.

81. The system of claim 80 wherein the ramp extends away from the cavity outwardly beyond at least one of the first and second planes.

* * * * *